United States Patent [19]
Lanfri et al.

[11] Patent Number: 4,938,255
[45] Date of Patent: Jul. 3, 1990

[54] SEALER FOR VACUUM CONTAINERS

[75] Inventors: James A. Lanfri, Sunnyvale; Valentin Balter, Cupertino, both of Calif.

[73] Assignee: Huntington Mechanical Laboratories, Inc., Mountain View, Calif.

[21] Appl. No.: 438,259

[22] Filed: Nov. 20, 1989

[51] Int. Cl.⁵ .............................................. F16K 31/50
[52] U.S. Cl. ..................................... 137/565; 137/580; 251/148; 251/215; 285/273
[58] Field of Search ................ 220/231, 303; 137/565, 137/580; 285/273; 251/148, 152, 368, 367, 215, 225

[56] References Cited

U.S. PATENT DOCUMENTS

| | | | |
|---|---|---|---|
| 1,502,650 | 7/1924 | Ashe | 251/367 |
| 2,732,169 | 1/1956 | Matteo | 251/148 |
| 3,198,480 | 8/1965 | Morse | 251/148 |
| 3,601,358 | 8/1971 | Cruse | 251/351 |
| 3,767,164 | 10/1973 | Robinson | 251/368 |
| 4,684,106 | 8/1987 | Kolenc et al. | 251/367 |
| 4,823,835 | 4/1989 | Chu | 137/580 |

*Primary Examiner*—A. Michael Chambers
*Attorney, Agent, or Firm*—David Pressman

[57] ABSTRACT

A sealer (10) for vacuum containers comprises a valve unit (12) and a removable vacuum-pump head (14). The valve unit consists of a valve housing (24) which can be connected to a vacuum container to be evacuated, for example through a flange (16), and a cylindrical valve element (42) inserted into the valve housing. The valve element has a top transverse opening (46) for interaction with a driving tool, a middle transverse hole (48) for connection to a source of vacuum through the above-mentioned vacuum pump head when the latter is fitted onto the valve element, a bottom transverse hole (52), and an axial bore (50) which connects the middle transverse hole to the bottom transverse hole. The valve element also has a threaded portion (44) which engages an inner thread (36) formed in the valve housing, so that the valve element can be screwed into the valve housing, and can interact with saddle (40) in the valve housing. When the valve element forms a predetermined gap G with the saddle, the vacuum container is connected to the source of vacuum through the above-mentioned gap, bottom transverse hole, axial opening, middle transverse hole, and vacuum pump head. One can evacuate, seal, transport and deliver the container to an installation site, or perform any other operation with the container in its evacuated and sealed state.

18 Claims, 2 Drawing Sheets

SEALER FOR VACUUM CONTAINERS

BACKGROUND—FIELD OF THE INVENTION

The present invention relates to vacuum containers, particularly to a sealer for such containers.

BACKGROUND—DESCRIPTION OF THE PROBLEM

Users of vacuum containers often require that they be delivered to an installation site in a sealed state. This is necessary to keep the container's vacuum intact after it is baked (to remove residual atmospheric molecules) at the manufacturer's facility. When the container arrives at the installation site in an evacuated and sealed state, it can immediately be connected to a vacuum system without the necessity of additional purging.

It is known (Catalog of Huntington Mechanical Laboratories, Inc., Mountain View, Cal.., 1984) to seal such containers by placing a copper gasket between a flange of the vacuum container and a flange of a cover for the container. A copper tube is passed through a radial hole in the gasket and is then braised to the gasket so that the tube passes from the inside of the container through the gasket to the outside. To seal the container, the tube is connected to a vacuum pump, the container is evacuated, and then the flanges are clamped tightly together to deform the gasket and pinch off the tube. Also the tube is further pinched at a location outside the gasket by a special pinching tool to completely and reliably seal the container.

The above-described special pinching tool is not always reliable for complete sealing. However, the main disadvantage of this method is that it makes a seal which is permanent and nonreusable.

OBJECTS AND ADVANTAGES OF THE INVENTION

Therefore several objects of the present invention are to provide a simple vacuum container sealer which permits a reliable, easy-to-use, and reusable vacuum container seal. Additional objects, features, and advantages of the invention will be understood after consideration of the ensuing description and accompanying drawings.

DRAWINGS

REFERENCE NUMERALS USED IN THE DRAWINGS AND DESCRIPTION

Figure 1:
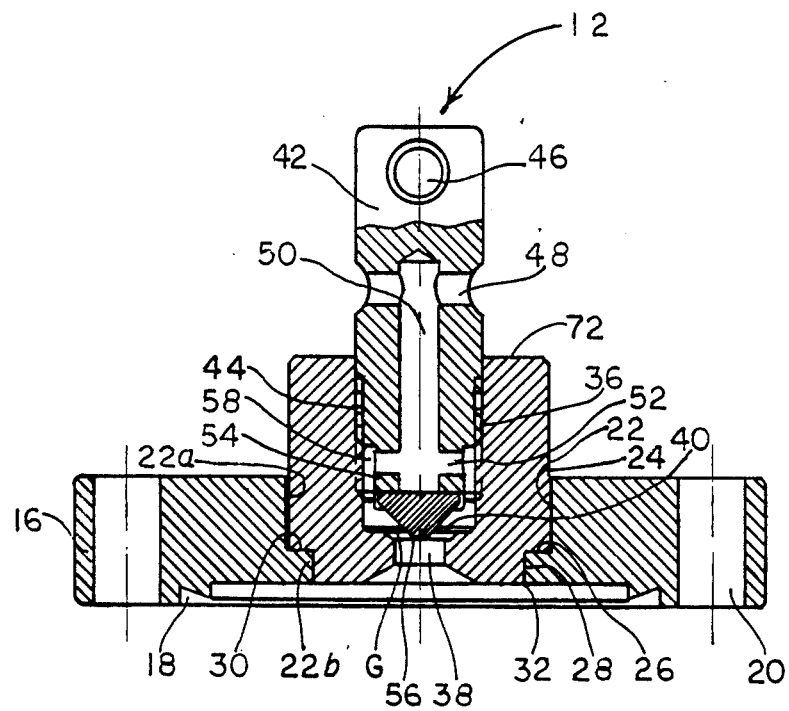
FIG. 1 is a general sectional view of a vacuum container valve unit according to the invention, the valve unit being shown without a vacuum pump head.

10—sealer for vacuum container
12—valve unit
14—vacuum pump head
16—flange
18—knife-edge sealing land
20—holes
22—central opening of flange
22a—larger diameter portion
22b—smaller diameter portion
24—valve housing
25—central opening
26—shoulder
28—front portion
30—shoulder of flange
32—groove for seal ring
36—threaded hole
38—through hole
40—saddle surface
42—valve element
44—outer thread
46—first through hole
48—second transverse hole
50—blind axial hole
52—third transverse opening
54—portion of valve element
56—valve cap
58—space within valve housing
60—cylindrical element
62—central hole
64—tube
66, 68—seal rings
70—lower end face of vacuum pump head
72—upper end face of valve housing

FIG. 1—DESCRIPTION OF VALVE UNIT 12

A sealer 10 (FIG. 3) for a vacuum container will now be illustrated in detail with reference to a specific practical embodiment which should not be construed as limiting the present invention. Sealer 10 consists of two major parts, a valve unit 12 (FIG. 1) and a vacuum pump head 14 (FIG. 2).

Valve unit 12 (FIG. 1) consists of a flange 16, a valve housing 24, and a valve element 42. Valve unit 12 can be attached in a conventional manner to a mating flange (not shown) of the vacuum container (not shown). The connection between both flanges must be properly sealed, e.g., by a knife-edge-type seal which is frequently used in high-vacuum techniques. A knife-edge sealing land 18 for effecting such a seal is provided on the lower surface of flange 16; this compresses a copper gasket (not shown) against the flange of the container. Flange 16 can be conventionally connected to the flange of the container by bolts (not shown) which are inserted through holes 20 arranged circumferentially on its periphery. Flange 16 has a stepped central opening 22 which consists of a larger diameter upper portion 22a and a smaller diameter lower portion 22b; these form an upwardly facing shoulder 30.

Valve housing 24 is shown positioned in opening 22 of flange 16. Housing 24 has a downwardly facing shoulder 26 on its lower side formed by a bottom portion 28 which has a smaller diameter than its remaining, upper part. Bottom portion 28 is inserted into smaller diameter portion 22b of flange 16, while shoulder 26 rests on mating shoulder 30. Valve housing 24 is then hermetically welded to flange 16 by a circular weld seam 32.

Figure 3:
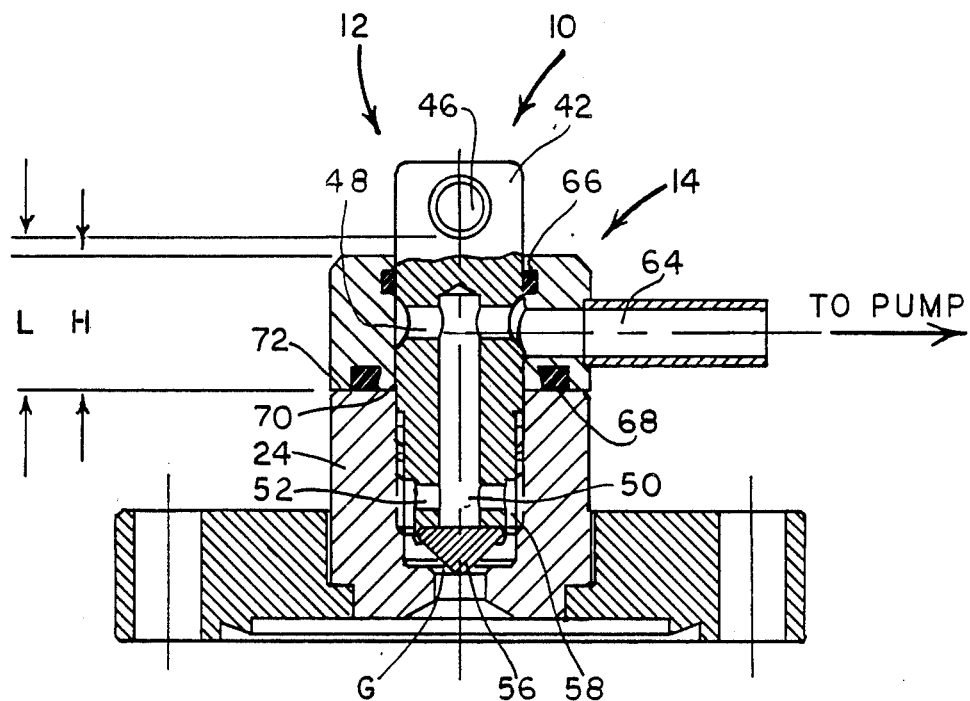
FIG. 3 is a sectional view illustrating the sealer of FIG. 1 with the vacuum pump head during evacuation of air from a vacuum container.

Valve housing 24 has a central opening 25 (FIG. 4), a part 36 (FIG. 1) of which is threaded. Opening 25 connects with a smooth through hole 38 in the lower part of housing 24. Through hole 38 thus connects the interior of threaded part 36 of opening 25 with the interior of the vacuum container (not shown) through central opening 25 of flange 16 and the flange (not shown) of the vacuum container. A tapered saddle surface or saddle 40 is formed on the upper edge of through hole 38. Thus, through hole 38 forms an inlet opening of the entire sealer 10 (FIG. 3).

Valve element 42 (FIG. 1) has a cylindrical shape and an outer thread 44 on its lower end. Element 42 is connected by means of thread 44 to threaded part 36 of opening 25 in valve housing 24. On its upper end, element 42 has a first or top hole 46 for insertion of a driving tool. Hole 46 is transverse to the axis of element 42.

In its intermediate portion, valve element 42 has a second or middle hole 48, which is transverse to opening 46 and the axis of element 42. Hole 48 forms an outlet opening of sealer 10 (FIG. 3). Hole 48 (FIG. 1) intersects a blind axial bore 50 which is formed through the body of valve element 42, beginning at its bottom end.

Near its lower end, bore 50 intersects with a third or bottom hole 52 which is transverse to the axis of element 42 and parallel to opening 46. In other words, middle opening 48 communicates with bottom hole 52 through bore 50.

A portion 54 of element 42 which is located below third hole 52 has a smaller diameter than threaded part 36, but a greater diameter than through hole 38. A conical insert or a valve cap 56 is inserted into the lower end face of valve element 42. Cap 56 seals saddle surface 40 of valve housing 24. Cap 56 should be appropriately attached to valve element 42, for example by caulking. Due to the provision of smaller diameter portion 54, a space 58 is formed between the outer walls of valve element 42 and inner walls of hole 36 in housing 24. Also a gap G is formed between valve cap 56 and saddle surface 40.

FIG. 2—DESCRIPTION OF VACUUM PUMP HEAD

A second major element of sealer 10 (FIG. 3) is vacuum pump head 14, shown separately in FIG. 2. This head consists of a cylindrical element 60 which has a central hole 62. A tube 64 is connected to the side wall of cylindrical element 60 so that the interior of the tube communicates with central hole 62. The connection between tube 64 and cylindrical element 60 should be properly sealed, e.g., by a hermetic weld seam (not shown).

The portion of central hole 62 above the connection to tube 64 has a seal ring 66. Another seal ring 68 is inserted into a circular groove formed on a lower end face 70 of element 60.

Element 60 has a height H, i.e., an axial length in the direction of opening 62, which is shorter than the length L (FIG. 3) between the bottom of top opening 46 and upper end face 72 of housing 24.

FIG. 3—ASSEMBLY OF HEAD TO VALVE UNIT

Figure 2:
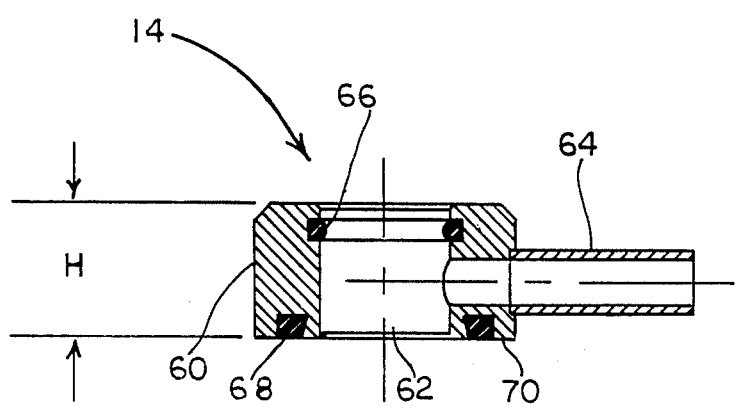
FIG. 2 is a sectional view of a vacuum pump head used in conjunction with the valve unit shown in FIG. 1.

When head of FIG. 2 is assembled to valve unit 12 of FIG. 1, central hole 62 of head 14 is positioned over element 42 of unit 12, as shown in FIG. 3. In this position, middle hole 48 will be located between seal rings 66 and 68, so that the source of vacuum (not shown), which is connected to tube 64, will communicate with hole 48. From hole 48, the vacuum link then communicates with bore 50, bottom hole 52, space 58, and, via gap G, to the vacuum container below (not shown) which is to be evacuated and sealed.

Head 14 (FIG. 2) is slidingly fitted onto the upper end of valve element 42, and lower end face 70 of head 60 rests on upper end face 72 of housing 24, as shown in FIG. 3. The condition L>H is necessary for operation of the device, as will be explained in detail later in the discussion of operation.

Tube 64 is connected to a source of vacuum, such as a vacuum pump (not shown). Seal ring 66 hermetically seals the connection between head 14 and the cylindrical surface of element 42 located above middle hole 48. Similarly, seal ring 68 hermetically seals the interface between lower face 70 of head 14 and upper face 72 of housing 24.

All parts of sealer 10 are made from stainless steel, except for valve cap 56, which is made from copper in order to provide a slightly deformable member which can conform to any irregularities in the saddle surface.

FIGS. 1–4—OPERATION OF THE DEVICE

Prior to operation, i.e., prior to evacuation of the vacuum container (not shown), flange 16 (FIG. 1) of sealer 10 is positioned on and sealingly attached in a conventional manner to an appropriate flange of a vacuum container (not shown).

Valve element 42 is screwed by means of its outer thread 44 into threaded hole 36 of housing 24. Adequate torque can be applied to element 42 by means of a tool, such as a bar, inserted into top hole 46. Element 42 is screwed in until gap G between the outer surface of valve cap 56 and saddle surface 40 is about 1 mm, as indicated in FIGS. 1 and 3. As has been mentioned above, the vacuum container to which device 10 is connected communicates with middle hole 48 via gap G, space 58, bottom hole 52, and bore 50.

In this position, head 14 (FIG. 2) is fitted onto the remaining externally projecting portion of element 42, so that lower end face 70 of head 14 rests on upper end face 72 of valve housing 24 (FIG. 3). As has been mentioned above, in this position distance L is greater than height H, so that enough room remains for the insertion of a drive bar into top hole 46 for rotating valve 42. In this position, tube 64 is located between seal rings 66 and 68, so that the interface between the cylindrical portion of element 42 above middle hole 48 and the inner walls of the central opening of head 14 is sealed by ring 66. The interface between surfaces 70 and 72 is sealed by ring 68.

Figure 4:
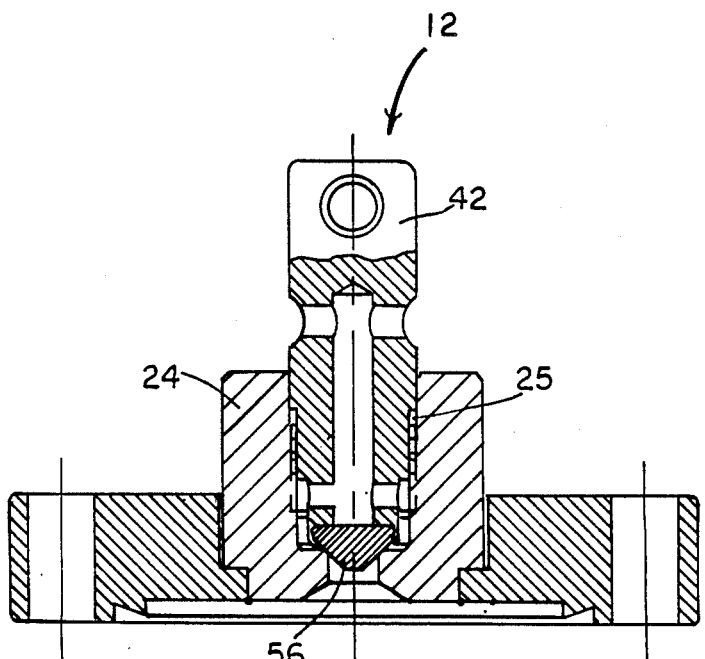
FIG. 4 is a sectional view illustrating the valve unit after sealing an evacuated container.

Tube 64 is then connected to a source of vacuum (not shown), so that air in the vacuum container is evacuated via gap G, space 58, bottom hole 52, axial bore 50, middle hole 48, and tube 64. When the vacuum in the container reaches a predetermined or required level, the driving tool is inserted into top hole 46 and element 42. Then the latter is rotated until gap G is closed or eliminated, i.e., valve cap 56 comes into tight contact with saddle surface 40 as shown in FIG. 4. In other words, the valve element is closed and communication between the vacuum container and the evacuation system is blocked.

Vacuum pumping can now be stopped and head 14 can be removed, leaving the device in the condition shown in FIG. 4. Here valve cap 56 hermetically seals the vacuum container. The container will remain in this state until it must be unsealed and filled with air or another gaseous medium. This can be easily done by using a bar (not shown) to partially unscrew element 42 from threaded hole 36 of housing 24, thus recreating gap G (FIGS. 1 and 3). Gap G connects the interior of the vacuum container with the surrounding atmosphere or with another source of gaseous medium via space 58, bottom hole 52, bore 50, and middle hole 38.

In an evacuated and sealed state, the vacuum container can be subjected to subsequent treatment, such as baking, or transported to an installation site. It does not require application of complicated crimping tools which are not always properly operated.

Synopsis, Ramifications and Scooe

We have just shown and described a simple device for sealing vacuum containers which is simple in construction, reliable in operation, reusable, and which does not require complicated and difficult-to-use crimping tools.

Although a specific embodiment of the sealer has been shown and described, many modifications and changes can be made within the scope of the invention. For example, valve housing 24 can be permanently and sealingly welded to the vacuum container, so that this element can belong to the construction of the vacuum container and will interact with valve element 42 and removable vacuum pump head 14 in the same manner as in the embodiment shown and described above. A hexagonal or square head can be formed on the upper end of element 42 instead of the top hole, so that a conventional wrench can be used to tighten or loosen element 42. A flexible hose can be used instead of tube 64 for connection to a source of vacuum. The valve housing, as well as vacuum pump head 14, may have any desired configuration. Valve cap 56 can be made from materials other than copper, and the remaining parts of sealer 10 can be made from materials other than stainless steel. Valve cap 56 can be threaded or press-fitted into valve element 42, instead of using caulking.

Therefore, the scope of the invention should be determined, not by the examples given, but by appended claims and their legal equivalents.

We claim:

1. A sealer for vacuum containers, comprising:
   a valve unit which is removably attachable to a vacuum container to be evacuated, said valve unit having an inlet opening and an outlet opening; and
   a removable connection element fitted onto said valve unit for sealingly connecting said outlet opening to a source of vacuum;
   said valve unit having moveable means for closing said inlet opening while said vacuum container is connected to said source of vacuum through said removable connection element, said moveable means being arranged to maintain said inlet opening in said closed state after disconnection of said removable connection element from said valve unit.

2. The sealer of claim 1 wherein said valve unit has a flange with an opening, said flange has means for removably effecting a sealed connection to said vacuum container, and further including a valve housing sealingly connected to said flange, said valve housing having an upper end face and a central through opening, one part of which is threaded and terminated in a saddle for said moveable means located above said inlet opening, said moveable means having an external thread engageable with said threaded portion, so that when said moveable means is threaded into said threaded portion, it can engage said saddle and sealingly close said inlet opening.

3. The sealer of claim 2 wherein said moveable means comprises a valve element having a non-threaded portion protruding from said valve housing and means for connection to a driving tool on said protruding portion, an end of said valve element opposite to said protruding portion facing said saddle.

4. The sealer of claim 3 wherein said driving means comprises a top transverse hole formed in said valve element in a direction transverse to its longitudinal axis, said valve element having a middle transverse hole between said top transverse opening and said threaded portion, a bottom transverse hole between said threaded portion and said saddle, and an axial bore connecting said second transverse opening with said bottom transverse hole.

5. The sealer of claim 4 wherein said removable connection element has a lower end face and a central hole which is fitted onto said protruding part of said valve element, sealing rings in said central hole for sealing connection between said removable element and said valve element, a tube which is sealingly connected at one end thereof to said central hole and at the other end to said source of vacuum, so that when said removable connection element is fitted onto said non-threaded portion of said valve element, said tube is connected with said middle transverse hole.

6. The sealer of claim 5 wherein said sealing rings comprise a first seal ring located below said top transverse hole, but above said middle transverse hole, and a second seal ring located between said lower end face of said removable connection element and said upper end face of said valve housing.

7. The sealer of claim 3 wherein said saddle-facing end of said valve element has a tapered insert which interacts with said saddle.

8. The sealer of claim 7 wherein said valve housing and said valve element are made from stainless steel, while said insert is made from copper.

9. A sealer for vacuum containers comprising:
   a valve unit removably attachable to a vacuum container to be evacuated and having a valve housing with a central hole, an inlet opening, and an outlet opening, and a valve element moveable in said central hole; and
   a removable vacuum pump head fitted onto said valve element for sealingly connecting said outlet opening to a source of vacuum;
   said valve housing having a flange with an opening, said flange having means for effecting a removable and sealable connection to said vacuum container, said valve housing being sealingly connected to said flange, said valve housing having an upper end face, one part of said central hole being threaded and terminating in a saddle for said valve element located above said inlet opening, said valve element having external thread engageable with said threaded part of said central hole, so that when said valve element is threaded into said threaded portion, it can engage said saddle and sealingly close said inlet opening, so that when said vacuum container is connected to said source of vacuum through said removable vacuum pump head, said inlet opening will remain in said closed state after disconnection of said removable vacuum pump head from said valve unit.

10. The sealer of claim 9 wherein said valve element has a non-threaded portion protruding from said valve housing, said means for connection to a driving tool being formed on said protruding portion, an end of said valve element opposite to said protruding portion facing said saddle, said vacuum pump head being removably fitted onto said protruding portion.

11. The sealer of claim 10 wherein said driving means comprises a top transverse hole formed in said valve element in the direction transverse to its longitudinal axis, said valve element having a middle transverse hole between said top transverse hole and said threaded portion, a bottom transverse hole between said threaded portion and said saddle, and an axial opening connecting said middle transverse hole with said bottom transverse hole.

12. The sealer of claim 11 wherein said removable vacuum pump head has a lower end face and a central hole which is fitted onto said protruding part of said valve element, a plurality of sealing rings in said central hole for effecting a sealed connection between said removable element and said valve element, a tube which is connected at one end thereof to said central hole and at the other end to said source of vacuum, so that when said vacuum pump head is fitted onto said non-threaded portion of said valve element, said tube will be connected with said second transverse opening.

13. The sealer of claim 12 wherein said sealing rings comprise a first seal ring located below said first transverse opening, but above said second transverse opening, and a second seal ring located between said lower end face of said vacuum pump head and said upper end face of said valve housing.

14. The sealer of claim 13 wherein in the position in which said vacuum pump head rests onto said valve housing, said top transverse hole is located above said vacuum pump head, so that said driving tool can be inserted into said top transverse hole.

15. The sealer of claim 10 wherein said saddle-facing end of said valve element has a tapered insert which interacts with said saddle.

16. The sealer of claim 15 wherein said valve housing and said valve element are made from stainless steel, while said insert is made from copper.

17. The sealer of claim 10 wherein said valve element has a portion of smaller diameter below said threaded portion, so that a space is formed between the outer surface of said smaller-diameter portion and said and inner surface of said central hole in said valve housing.

18. The sealer of claim 17 wherein said space communicates with said bottom transverse hole and said inlet opening, so that when said threaded portion of said valve is screwed into said threaded portion of said central hole, said valve element seals onto said saddle and closes said inlet opening.

* * * * *